Dec. 23, 1941. J. J. McCRAVE 2,267,285
ELASTIC FISHING TACKLE
Filed Nov. 3, 1939
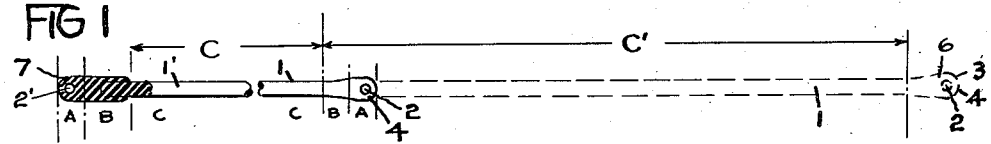
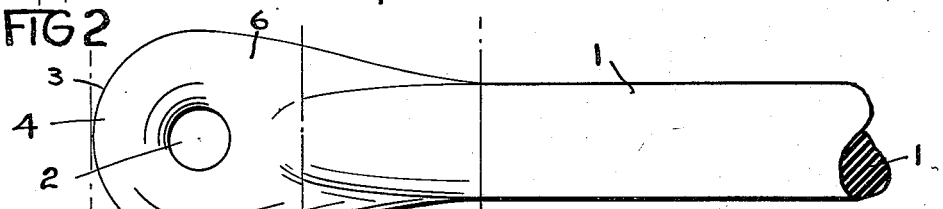
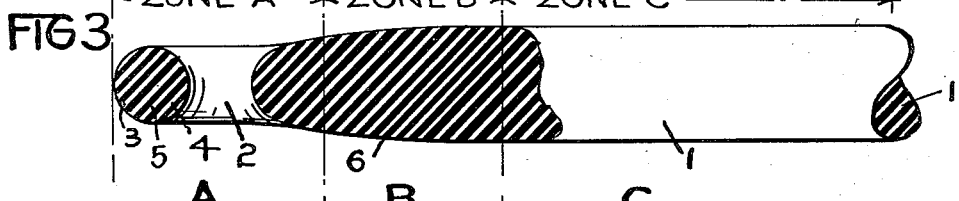
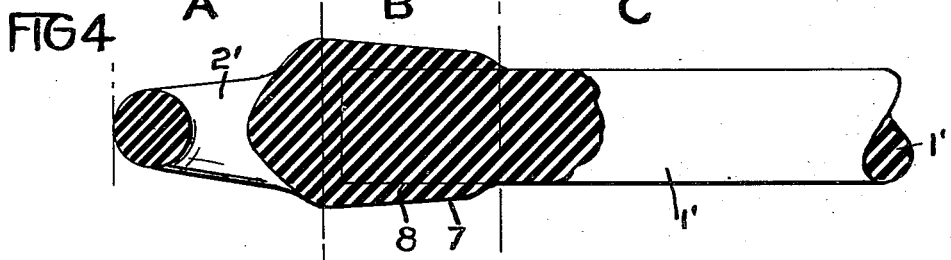
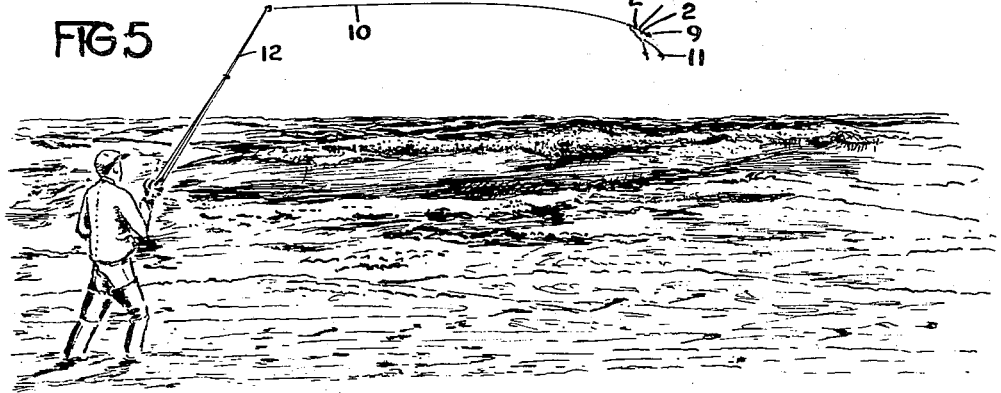
INVENTOR.
JOHN J. McCRAVE.
BY Paul A. Talbot.
ATTORNEY.

Patented Dec. 23, 1941

2,267,285

UNITED STATES PATENT OFFICE 2,267,285

ELASTIC FISHING TACKLE

John J. McCrave, New York, N. Y.

Application November 3, 1939, Serial No. 302,715

7 Claims. (Cl. 43—28)

My invention relates to an elastic device in fishing tackle and particularly for an elastic secured near the end of the line close to the hooks and sinker and has among its purposes and objects to provide:

An elastic having ends which will not break.

A means of providing a durable eye in the ends of an extremely elastic member.

An elastic for fishing which is smooth on its surface to prevent fouling and cutting the fish line.

A device which increases the distance of casting.

A device preventing the line from breaking when it fouls in running out from the reel.

A device preventing abnormal jerks at the end of the line from breaking it.

A device decreasing the loss of fish by their violent jerks.

A means of decreasing the loss of hooks, tackle, and sinkers.

An aid to greater catches of fish for anglers.

I accomplish these and other objects by the construction herein described and shown in the accompanying drawing forming a part hereof in which:

Fig. 1 is an elevation and section of my device.

Fig. 2 is an enlarged detail of one of the ends.

Fig. 3 is an enlarged sectional detail of one of the ends.

Fig. 4 is an enlarged sectional detail of a modification.

Fig. 5 is a perspective view showing one of the applications of my device.

Similar reference characters refer to similar parts throughout the several views of the drawing and in the specifications to follow.

Devices to reduce the loss of tackle in surf casting and to absorb shocks and jerks have been devised for many years but few of these have been extensively used because they were defective in meeting the test of practical use.

Those employing springs were soon destroyed by sand and salt water and were too easily tangled up with the line. Rubber devices as well as those with part rubber and metal eyes did not survive the unusual stresses ordinary use required of them because the elastic part to be strong and yet extremely elastic could not easily be secured to an eye which would not soon pull off. The elastic was either too hard to be a good elastic or the manner of securing the eye too clumsy to be practical.

By the construction of my device, I have overcome the defects of others and have produced an elastic which will not foul, cut the line, corrode or break, yet is compact and cheap to manufacture thus permitting its universal use as it more than pays for its purchase by saving the cost of tackle which would be lost and it adds to the catches of fish.

My device may be secured between the sinker and at the position where the hooks are secured to the line, or may be attached between the end of the line and the hooks and sinker, or each hook may be provided with a separate elastic in the leader from the line to the hooks.

The angler will soon discover the merit of the use of my device wherever, in his tackle, shocks and jerks are to be absorbed.

One of the uses is apparent to every surf caster in preventing the breakage of his line and the loss of his tackle when the line becomes fouled in the reel while casting. The jerk caused by the flight of the sinker being thus suddenly stopped is absorbed by the elastic stretching to its utmost and this requires that extremely soft rubber be used, yet it must be capable of withstanding 30 or 40 pounds tensil strain without breaking.

I am not limited, of course, to the size suitable for a 30 to 40 pound tensil strength, as my device may be made in various sizes to suit the various purposes to which it is adapted.

I have herein shown, for the purpose of illustration, my preferred construction and it is expected that those skilled in the art to which my invention pertains may see that numerous modifications may be made without departing from the principles underlying and embodied in my invention.

My device comprises an elastic body 1 having a length greater than its width and an end 3 provided with an eye 2, or other means for securing my device to the other tackle at each end.

The eyes 2 are formed in the ends 3 which preferably are shaped to substantially form a ring 4 having a round cross section 5 for about one half of the circumference. The other half of the circumference 6 around the eye is tapered toward and blended into the elastic body.

The material around the eyes is relatively hard and in the drawing I have shown the hard portion as zone A. Zone B is more pliable but considerably harder than zone C which is the softest, most pliable, and elastic of the three zones and is the body 1 which stretches under tension as may be seen by referring to Fig. 1 of the drawing in which the stretched zone C is designated by C' in broken lines.

Fig. 4 shows the eye 2' as formed in a separate end piece 7 which is secured to the body 1' along the line 8. The piece 7 may be secured by heat or cement or both so that the material around the eye 2' will be hard in the zone A, softer in the zone B where the parts are joined and softest in the zone C.

In Fig. 5, I have shown the sinker 9 positioned at the end of my device which is secured to the end of the line 10 and the hooks and bait 11 are shown secured to the line between my device and the reel and pole 12.

The use of my device may be applied in numerous ways and may be constructed in various sizes to conform to the strength of the tackle used, and while I have herein described the construction in detail, I do not wish to be limited to the details of construction as I may wish to depart therefrom within the scope of the appended claims which set forth my invention.

I claim:

1. In a device for fishing tackle, an elastic body of soft pliable material, ends integral with said body, and eyes in said ends, said ends being of semi-elastic material relatively harder than said body, whereby said ends are prevented from stretching.

2. In an elastic device for fishing tackle, a body portion of elastic material stretchable under tension, relatively greater in length than width, the ends of said body having eyes therein, the material of said ends being relatively harder than the material of said body portion to prevent stretching of the material around said eyes.

3. An elastic device for fishing tackle comprising a main portion (zone C), and end portion (zone A), and an intermediate portion (zone B), an eye in said end portion, and said intermediate portion being less elastic than said main portion and more elastic than said end portion.

4. In a device of the nature described comprising a main portion (zone C) of great elasticity, said body portion having ends with eyes therein in the end portions (zone A) of less elastic material and harder than the main portion (zone C).

5. In a device of the nature described comprising a body portion of great elasticity in the main portion (zone C), having intermediate portions (zones B) of less elastic material and formed integral with said body portion and end portions (zone A) formed integral with intermediate portions (zones B), and of material harder than either the main portion or intermediate portions (zone C) and (zones B).

6. In a device for fishing comprising a main portion (zone C) of rubber or the like, stretchable under tension and having its ends hardened at the portions (zone A) to provide securing means for fishing tackle.

7. In a device of the nature described, comprising a body of great elasticity in the main portion (zone C) and having ends of elastic material with eyes therein in the end portions (zone A), harder and less elastic than said main portion (zone C) and having intermediate portions (zones B) between the main portion (zone C) and end portions (zone A), harder and less elastic than the main portion (zone C) and softer and more elastic end portions (zone A).

JOHN J. McCRAVE.